United States Patent
Prakash et al.

(10) Patent No.: US 6,444,343 B1
(45) Date of Patent: Sep. 3, 2002

(54) POLYMER ELECTROLYTE MEMBRANES FOR USE IN FUEL CELLS

(75) Inventors: G. K. Surya Prakash, Hacienda Hts.; George A. Olah, Beverly Hills; Marshall C. Smart, Studio City; Sekharipuram R. Narayanan, Altadena, all of CA (US); Qungie J. Wang, Huckessin, DE (US); Subbarao Surumpudi, Glendora; Gerald Halpert, Pasadena, both of CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 08/846,972

(22) Filed: Apr. 30, 1997

Related U.S. Application Data (63) Continuation of application No. 08/751,366, filed on Nov. 18, 1996, now abandoned.

(51) Int. Cl.[7] ............................................. H01M 8/10
(52) U.S. Cl. ............................................. 429/33; 429/34
(58) Field of Search ............................... 429/33, 34, 13

(56) References Cited

U.S. PATENT DOCUMENTS

| | | | |
|---|---|---|---|
| 3,423,228 A | 1/1969 | Oster et al. ............... 117/47 |
| 4,419,209 A | 12/1983 | Klinkowski | |
| 4,537,840 A | * 8/1985 | Tsuki ....................... 429/33 |
| 4,596,858 A | 6/1986 | Gregor et al. | |
| 4,605,685 A | * 8/1986 | Momose ................... 522/124 |
| 4,729,930 A | * 3/1988 | Beal .......................... 429/13 |
| 5,049,275 A | * 9/1991 | Gillberg-LaForce ... 210/500.27 |
| 5,260,143 A | * 11/1993 | Voss ........................ 429/13 |
| 5,460,896 A | * 10/1995 | Takada ..................... 429/33 |
| 5,523,177 A | 6/1996 | Kosek et al. .............. 429/40 |
| 5,599,638 A | * 2/1997 | Surampudi ................ 429/23 |
| 5,599,640 A | * 2/1997 | Lee .......................... 429/46 |
| 5,643,689 A | * 7/1997 | Fleischer .................. 429/33 |
| 5,645,950 A | 7/1997 | Benz et al. | |
| 5,679,482 A | * 10/1997 | Ehrenberg ............... 429/249 |
| 5,834,523 A | * 11/1998 | Steck ........................ 521/27 |
| 5,919,583 A | 7/1999 | Grot et al. | |

FOREIGN PATENT DOCUMENTS

| | | |
|---|---|---|
| EP | 0 629 013 | 12/1994 |
| EP | 0 716 463 | 6/1996 |

OTHER PUBLICATIONS

Hawley's Condensed Chemical Dictionary, 11th Ed., Van Nostrand Reinhold, New York, NY, 1987.*
Narayanan et al, "Recent Advances in PEM Liquid–feed direct methanol fuel cells", Battery Conference on Applications and Advances, 1996., Eleventh Annual Long Beach CA, USA 9–12 Jan. 1996, New York, NY, pp. 113–122.

* cited by examiner

*Primary Examiner*—Carol Chaney
*Assistant Examiner*—Mark Ruthkosky
(74) *Attorney, Agent, or Firm*—Fish & Richardson P.C.

(57) ABSTRACT

A polymer electrolyte membrane composed of polystyrene sulfonic acid (PSSA) crosslinked within a poly(vinylidene fluoride) (PVDF) matrix is provided. This membrane exhibits low methanol crossover which translates to higher fuel and fuel cell efficiencies. A fuel cell comprising a PSSA-PVDF membrane is also provided. Further, methods of decreasing the fuel crossover rate, enhancing fuel cell efficiency, and enhancing electrical performance of a fuel cell are provided.

14 Claims, 8 Drawing Sheets

POLYMER ELECTROLYTE MEMBRANES FOR USE IN FUEL CELLS

This application is a continuation of Ser. No. 08/751,366 filed Nov. 18, 1996, abandoned.

FIELD OF THE INVENTION

The present invention describes polymer electrolyte membranes. More specifically, the present invention describes a polymer electrolyte membrane with special properties that are optimized for use in direct methanol fuel cells.

BACKGROUND OF THE INVENTION

The use of gasoline-powered internal combustion engines has created several exhaust gas-related environmental problems. Pollution control measures cannot completely cleanse the environment of exhaust gases that are produced upon burning of non-renewable fossil fuel.

Tremendous efforts have been directed towards finding a satisfactory solution to the pollution problems that currently plague the environment. One possible solution is the use of fuel cells. Fuel cells are highly efficient electrochemical energy conversion devices which directly convert the chemical energy derived from a renewable fuel into electrical energy. Significant research activity has focussed on the development of proton-exchange membrane fuel cells, which have shown promise in low-temperature portable applications. The proton-exchange membrane fuel cells have a polymer electrolyte membrane disposed between a positive electrode (cathode) and a negative electrode (anode). The polymer electrolyte membrane is composed of an ion-exchange polymer (i.e. ionomer) and its role is to provide a means for ionic transport and prevent mixing of the molecular forms of the fuel and the oxidant.

Polymer electrolyte membranes intended for $H_2/O_2$ fuel cell applications were initially made by condensation of phenolsulfonic acid and formaldehyde. These membranes had certain structural limitations and were seen to be brittle, prone to cracking when dried, and subject to rapid hydrolysis.

Amberplex C-1 and Amberplex A-1 membranes (Rohm & Haas Company), described in U.S. Pat. No. 2,913,511, were later suggested for use in $H_2/O_2$ fuel cells.

Polymer electrolyte membranes based on partially sulfonated polystyrene have also been investigated for use in $H_2/O_2$ fuel cells.

The ionomer has typically been blended with inert polymers such as fluorinated polymers in order to improve the oxidative, thermal and dimensional properties of polymer electrolyte membranes. However, introduction of an inert matrix does not alter the chemical and thermal properties of the ionomer. Moreover, large proportions of the inert matrix may increase the ionic resistance of the polymer electrolyte membrane. This reasoning led to the development of "D-Membranes," which were fabricated by cross-linking styrene-divinylbenzene with an inert fluorocarbon matrix, followed by sulfonation. Appleby and Jaeger, *Energy*, 1986, 11, 137. However, the lifetimes of these $H_2/O_2$ fuel cells were less than optimal due to degradation resulting from attack on the weak α-C—H bond in the polymer structure.

In order to address the stability problem observed with the "D-Membranes," General Electric Company developed the "S-Series" of membranes which were fabricated from homopolymers of α,β,β-trifluorostyrene-sulfonic acid. Chapman, Proc. 7th Intersoc. Energy Conv. Eng. Conf., 1972, 466; and Hodgdon et al., U.S. Pat. No. 3,341,366, issued Sep. 12, 1967. Although these membranes exhibited good chemical and thermal properties, their physical properties were less than adequate.

Soon after, DuPont Chemical Company developed the NAFION™ series of polymer electrolyte membranes which found use in fuel cell space applications. Nafion has been considered as the membrane of choice. However, high cost associated with the use of Nafion membranes is a disadvantage.

A liquid-feed fuel cell such as a direct methanol fuel cell (DMFC) has shown promise. A DMFC uses an aqueous methanol solution at temperatures as low as 60–90° C. Current state-of-the-art liquid-feed fuel cells have a carbon-supported Pt-Ru catalyst at the anode, carbon-supported Pt catalyst at the cathode and a polymer electrolyte membrane positioned between the anode and the cathode. An aqueous solution of an organic fuel is circulated at the anode by a pump element, which can be a conventional pump, or a more inactive pump such as vapor lock or the like. Oxygen or compressed air is supplied at the cathode. An ideal polymer electrolyte membrane should be impermeable to the organic fuel. However, the membrane may allow permeation of some organic fuel from the anode to the cathode. This is termed "fuel crossover." Fuel crossover decreases fuel efficiency and fuel cell efficiency.

The most advanced DMFC systems use a Nafion 117 perfluorocarbon proton-exchange membrane (DuPont Chemical Company) as their electrolyte. Nafion 117 membranes demonstrate high conductivity and possess high power and energy density capabilities. However, use of Nafion 117 membranes in DMFCs is associated with disadvantages including very high cost, and a high rate of methanol permeation from the anode compartment, across the polymer electrolyte membrane (i.e. Nagion 117 membrane), to the cathode. This "methanol crossover" lowers the fuel cell efficiency. The diffusion coefficient for methanol in Nagion 117 membranes has been reported to be in the order of $10^{-5}$ cm/s. Verbrugge, *J. Electrochem. Soc.*, 1989, 136, 417.

Methanol crossover results in decreased fuel cell voltage and efficiency due to the oxidation of methanol to carbon dioxide at the cathode. Therefore, it is important that the extent of methanol crossover be as small as possible. Consequently, research efforts have focussed on methods of decreasing methanol crossover in DMFCs so that higher cell voltage and efficiency may be achieved.

One approach aimed at decreasing the methanol crossover rate involved polymer-bonded particle hydrates based on tin-mordinite. Lundsgaad et al., *Proc. Electrochem. Soc.*, 1993, 140, 1981; and Lundsgaad et al., *Solid State Ionics*, 1994, 72, 334. These membranes exhibited lower methanol diffusion, however, they showed modest conductivities at room temperature and decreased solvent uptake.

Another approach aimed at decreasing methanol permeation across the electrolyte membrane involved three-layered electrolyte systems based upon the use of metal hydride films serving as methanol-impermeable proton conductors sandwiched between proton-permeable electrolyte membranes. Pu et al., *J. Electrochem. Soc.*, 1995, 142, L119. Such systems have been reported to have low methanol permeability when operated in $H_2/O_2$ fuel cells. However, no data is available for their application in aqueous liquid-feed DMFCs.

Polymer electrolyte membranes comprising polybenzimidazole films doped with phosphoric acid have also been investigated for use in DMFCs. Wainwright et al., *J. Electrochem. Soc.,* 1995, 142, L121. Although these membranes have demonstrated decreased methanol permeability in vapor-feed fuel cells, they have not been amenable for use in liquid-feed DMFCs as they only display adequate conductivities at temperatures as high as 150–200° C.

Several polymer electrolyte membranes have been fabricated to decrease methanol crossover and enhance fuel cell efficiency. However, these membranes have significant limitations when applied to low-temperature liquid-feed DMFCS. Consequently, there is a need for polymer electrolyte membranes which are functional in low-temperature liquid-feed DMFCS, and that display low methanol crossover rates and high fuel cell efficiencies.

SUMMARY OF THE INVENTION

The present invention provides a novel polymer electrolyte membrane composed of sulfonated polystyrene crosslinked with divinylbenzene, referred to herein as PSSA polystyrene sulfonic acid and poly(vinylidene fluoride) "PVDF". The material used could also be sulfonated and cross-linked polystyrene/divinylbenzene and PVDF. Both materials can be called PSSA-PVDF. A preferred mode uses these materials in a fuel cell. In one preferred embodiment of the present invention the fuel cell is a liquid-feed fuel cell. In another preferred embodiment the fuel cell is a direct methanol fuel cell.

The present invention also provides a novel fuel cell comprising a polymer electrolyte membrane composed of polystyrene sulfonic acid and poly(vinylidene fluoride). In a preferred embodiment said fuel cell is a direct methanol fuel cell.

The present invention further provides a method of decreasing methanol crossover rates in a direct methanol fuel cell. Methanol crossover rate in said direct methanol fuel cell is decreased by using a polymer electrolyte membrane which is composed of polystyrene sulfonic acid and poly(vinylidene fluoride).

The present invention also provides a method of enhancing efficiency of a direct methanol fuel cell. The efficiency of said direct methanol fuel cell is enhanced by using a polymer electrolyte membrane which is composed of polystyrene sulfonic acid and poly(vinylidene fluoride).

The present invention additionally provides a method of enhancing electrical performance of a direct methanol fuel cell by using low flow rates of oxygen at the cathode of the fuel cell.

DETAILED DESCRIPTION OF THE INVENTION

The present invention provides a polymer electrolyte membrane intended for use in an electrochemical reaction in a fuel cell. The membrane is fabricated by the immobilization of cross-linked polystyrene sulfonic acid ("PSSA") within an inert matrix of poly(vinylidene fluoride) ("PVDF"). This resulting membrane functions as an ionexchange electrolyte when used in a fuel cell.

A direct methanol fuel cell produces energy according to the equations shown below.

At the anode:

At the cathode:

Methanol is used as fuel in a direct methanol fuel cell. The methanol is oxidized at the anode. This electro-oxidation at the anode produces carbon dioxide, electrons, and protons. Electrons are conducted through the external load and are captured at the cathode. The oxidant, i.e. protons, are transported directly across the polymer electrolyte membrane to the cathode. Thus a flow of current is maintained by a flow of protons through the membrane of the fuel cell and a flow of electrons through the external load. However, fuel crossover from the anode through the membrane to the cathode can occur which lowers the operating potential of the cathode and represents consumption of fuel without production of useful electrical energy. Thus fuel crossover lowers efficiency and electrical performance of the fuel cell.

Hence the main functions of the polymer electrolyte membrane include preventing the molecular forms of fuel and oxidant from mixing, and providing a means for ionic transport. It must also ensure that electrons pass from the fuel to the oxidizing electrode only via the external current.

An ideal fuel cell electrolyte is one which is permeable to a single ionic species. Polymer electrolyte membranes are generally composed of polymer networks to which functional groups capable of exchanging anions or cations are attached.

The polymer electrolyte membranes of the present invention are composed of polystyrene sulfonic acid and poly(vinylidene fluoride) ("PSSA-PVDF"). These membranes have exhibited high conductivities at low temperatures (25–90° C.), low methanol permeability rates when used in direct methanol fuel cells, and have been successfully operated in low-temperature direct methanol fuel cells. Also, polymer electrolyte membranes of the present invention which are made of polystyrene sulfonic acid and poly(vinylidene fluoride), used in low temperature direct methanol fuel cells, display high fuel and fuel cell efficiencies.

The present invention also provides a novel fuel cell which makes use of a polymer electrolyte membrane composed of polystyrene sulfonic acid and poly(vinylidene fluoride).

Figure 1:
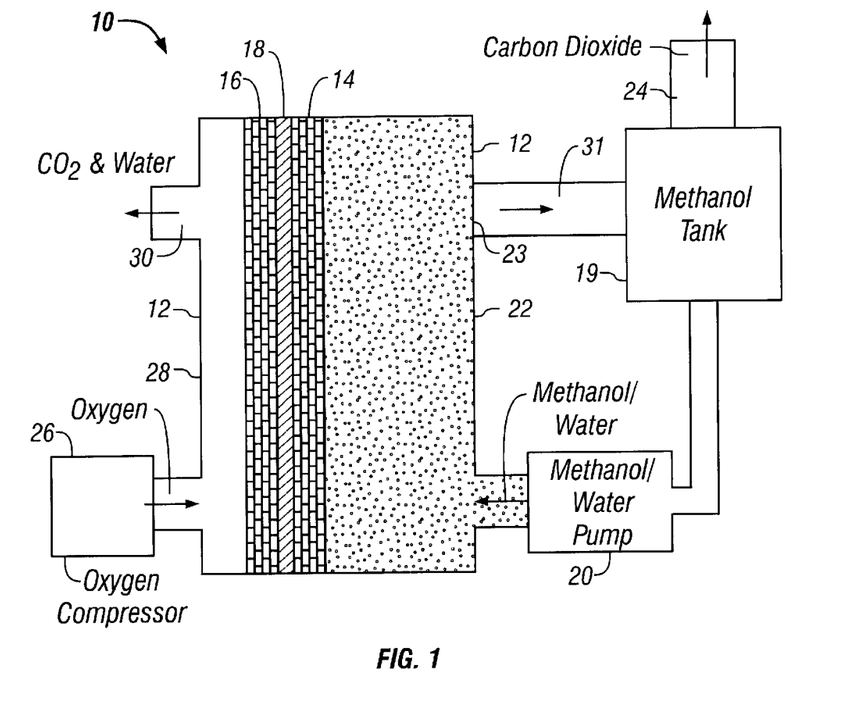
FIG. 1 is a schematic diagram of a direct methanol fuel cell having a polymer electrolyte membrane configured in accordance with the present invention.

FIG. 1 shows a fuel cell 10 comprising a housing 12, an anode 14, a cathode 16 and a polymer electrolyte membrane 18. Preferably, the anode, cathode and membrane are integrated to form a single composite structure, with the polymer electrolyte membrane being interposed between the two electrodes, referred to as a membrane electrode assembly (MEA). It is preferred that the anode have carbon-supported Pt—Ru catalyst and the cathode have carbon-supported Pt. Pump 20 circulates an aqueous solution of an organic fuel in the anode compartment 22 of housing 12. The organic fuel is withdrawn via an appropriate outlet 23 and may be recirculated. Carbon dioxide formed at the anode may be vented via an outlet port 24 in tank 19. The fuel cell is also provided with an oxygen or air compressor 26 to feed oxygen or air into the cathode compartment 28 within housing 12.

Prior to operation, an aqueous solution of the organic fuel (such as methanol) is introduced into the anode compartment 22 of the fuel cell while oxygen or air is introduced into the cathode compartment 28. Next, an electrical load is connected between anode 14 and cathode 16. At this time, the organic fuel is oxidized at the anode and leads to the production of carbon dioxide, protons and electrons. Electrons generated at anode 14 are conducted via the external load to cathode 16. The protons generated at anode 14 migrate through polymer electrolyte membrane 18 to cathode 18 and react with oxygen and electrons (which are transported to the cathode via the external load) to form water.

The present invention further provides a method of decreasing methanol crossover in direct methanol fuel cells by using polymer electrolyte membranes composed of poly-styrene sulfonic acid (PSSA) and poly(vinylidene fluoride) (PVDF). Methanol crossover results in the loss of fuel and decreased cell voltage and efficiency. PSSA-PVDF membranes display poor methanol permeability, thereby decreasing the rate of methanol permeation from the anode to the cathode, consequently decreasing the oxidation of methanol to carbon dioxide at the cathode.

The present invention also provides a method of enhancing the efficiency of a direct methanol fuel cell by using a polymer electrolyte membrane composed of PSSA-PVDF. Efficiency of the fuel cell is enhanced by using a PSSA-PVDF membrane as this membrane decreases with minimal permeation of the fuel from the anode to the cathode. When the fuel used is methanol, this permeation is called methanol crossover. Methanol crossover decreases the cell voltage.

The present invention also provides a method of enhancing electrical performance of a fuel cell. During the operation of a direct methanol fuel cell, oxygen is circulated around the cathode. Electrical performance of the direct methanol fuel cell is enhanced by circulating oxygen at a low flow rate around the cathode. Decreasing the flow rate of oxygen leads to dramatically improved performance of the fuel cell. Higher flow rates of oxygen tend to have a drying out effect on the membrane. This drying out effect increases the resistivity of the membrane since conductivity of the membrane depends on its hydration level. Increased resistivity of the membrane, in turn, leads to an increase in the resistivity of the fuel cell which leads to decreased electrical performance.

One problem with the NAFION™ membranes is that they often perform poorly under such low flow oxygen conditions.

The following examples illustrate the invention and are not intended to limit the same.

EXAMPLES

Example 1

Preparation of PSSA-PVDF Polymer Electrolyte Membranes

The first step of the process involves preparation of a membrane. One preferred technique prepares the membranes were prepared according to the method described by Hodgdon and Boyack (*J. Polymer Sci.: Part A,* 1965, 3, 1463) in which an interpolymer system is fabricated. This system comprises sulfonated polystyrene-divinylbenzene polymerized within a poly(vinylidene fluoride) (PVDF) matrix. The initial step involves fabrication of a PVDF membrane which could serve as an inert polymer matrix. This was achieved by introducing PVDF powder into a mold, placing the molded powder in a hot press and heating the resulting sample to 160–180° C. This procedure results in the production of strong, flexible membranes.

Alternatively, the PVDF membrane is prepared in a polar aprotic solvent, such as acetone, dimethylsulfoxide or tetrahydrofuran, cast into membranes and placed in a hot press at 160–180° C.

Another possible technique starts with a product of a commercially-available PVDF film, such as Kynar™ sheets, available from Elf Autochen. Kynar is a copolymer of PVDF and hexafluoropropylene ("HFP", or a homopolymer of PVDF). Kynar™ 740, Kynar™ 460 and Kynarflex are the most particularly preferred.

The inventors realized that this initial precursor serves as an efficient inert matrix material, and formed a useful backbone for the further processing. However, other precursor materials can also be used, including:

Polytetrafluoroethylene-N-vinylpyrrolidone (PTFE-PVP)

Polytetrafluoroethylene (PTFE)

| | |
|---|---|
| Polyvinyl alcohol - polyacrylonitrile | (PVA-PAN) |
| Polyvinyl chloride | (PVC) |
| Polyvinyl alcohol | (PVA) |
| Polyacrylamide | (PAAM) |
| Polyethylene oxide | (PEO) |
| Polypropylene | (PP) |
| Polyethylene | (PE) |
| Polysulfone | (PS) |
| Sulfonated polysulfone | |
| Polyethersulfone | (PES) |
| Polyetherimide | (PEI) |
| Polymethylsulfoxide | |
| Polyacrylonitrile | |
| Glass membrane composites (hollow fibers) | |
| Ceramic matrix host composites | |
| Zeolite matrix hosts | |

These materials can be used as the inert polymer matrices, instead of PVDF, into which the PS/DVB mixtures are impregnated to produce interpenetrating polymer networks. Further, to the PS/DVB mixtures other ionomers and cross linking agents can be added to obtain impregnated inert polymer hosts. These materials can alternatively be blended with PVDF to produce composite inert host matrices and then subsequently impregnated with PS/PVDF.

The membrane is next impregnated and polymerized. First, the PVDF membrane is equilibrated by immersing in acetone (or other polar aprotic solvents, $CH_2Cl_2$, THF, DMF, DMSO, etc.) at 35° C. for 24 hours. This has the effect of swelling the membrane. The PVDF membrane is then immersed in a bath of styrene, divinylbenzene (DVB) and AIBN (0.3–0.4% by weight). Any other polymerization initiator could be used in place of the AIBN. The ratio of styrene to divinylbenzene controls the amount of cross-linking. If, for example, DVB/PS=4/96, then the resultant material is 4% cross linked. The ratio can be varied to produce different degrees of cross-linking in the polymer matrix, with 1–12% of divinylbenzene, and more preferably 4%, being the optimum composition. The impregnation polymerization is done typically 3 to 4 times creating a sequential interpenetrating polymer network (with 3–5% weight increase in each iteration). The styrene to DVB ratio can be altered in the impregnation steps to create the final product matrix which has a gradient of cross-linking degree. This technique can be utilized to produce the desired properties amenable to improved electrode/membrane interface characteristics due to better electrocatalytic layer bonding and contact. This method is also useful to alter the sulfonic acid density distribution throughout the polymer mix.

After removal from the bath, the membrane is placed between sheets of stiff Al or Ti sheets, placed in a hot press and heated to 150° C.–170 C. for 1 hour at 500–2000 psi. This procedure is repeated until a 15–25% increase in membrane weight was achieved.

The membrane is then sulfonated by immersion in chlorosulfonic acid $ClSO_3H$ (15% solution in chloroform) for 24 hours. This was followed by washing in distilled water and hydrolyzing in distilled water at 65° C. This procedure resulted in the fabrication of flexible polymer electrolyte membranes having 90–100% sulfonation, and hence most rings having one sulfonic acid group per aromatic ring.

Alternate sulfonation processes can be used.

Sulfonation of the polymers may be carried out by conventional methods including the use of sulfuric acid, sulfur trioxide, oleum, acetyl sulfonate, acyl sulfate complexes, chlorosulfonic acid or with mixtures. The procedure of using chlorosulfonic acid/carbon tetrachloride ($ClSO_3H/CCl_4$) involves a high degree of reaction product swelling, which is believed to result in the highest degree of sulfonation.

Evaluation of Permeability of Polymer Electrolyte Membranes

Figure 2:
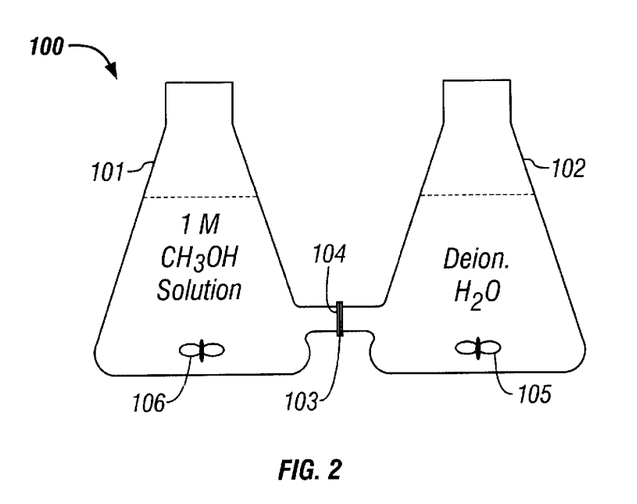
FIG. 2 is a schematic diagram of the apparatus used to evaluate methanol permeability across a polymer electrolyte membrane.

The membrane permeability is evaluated using apparatus 100 shown in FIG. 2. Vessel 101 and vessel 102 are connected by a ground down O-ring joint 103 which accommodates a polymer electrolyte membrane sample 104. The individual capacity of each of vessels 101 and 102 is 250 mL and the inner diameter of joint 103 is 2.4 cm (area=1.44 $cm^2$) The membrane sample 104 is introduced into O-ring joint 103. At the same time, 250 mL of a methanol solution (1 M) are added to vessel 101 and 250 mL of deionized water are added to vessel 102. At regular measured intervals, samples are withdrawn from vessel 102 and analyzed for methanol content using a gas chromatograph (Varian 3300) equipped with a Carbowax column. An internal standard, e.g. propanol, is used as a reference for the determination of the concentration of the solution during all gas chromatographic measurements. Stirrer 105 is activated during the experiment to prevent concentration build-up in vessel 102.

The procedure described above is also repeated at higher temperatures and with different methanol concentrations.

Measurement of Membrane Conductivity

Conductivity of the polymer electrolyte membrane was measured using two different techniques. The first technique involved placing the polymer electrolyte membrane sample between two graphite electrodes and clamping them together with an O-ring joint. The bulk electrical resistivity was then measured using a Hewlett-Packard milliohmeter. The resistivity values were then converted to conductivity values using the equation shown below.

$$\sigma = (1/R_B) \times (1/A)$$

The second technique which was used for the measurement of membrane conductivity involved using a "four probe" apparatus similar to that described by Cahan and Wainright (*J. Electrochem. Soc.*, 1993, 140, L185). The polymer electrolyte membrane was placed in a PTFE housing which was equipped with two platinum strips in contact with the film. Two platinum electrodes in a fixed geometry (distance of 1.026 cm) were placed on the surface of the film and the potential gradient along the membrane, under current, is measured. Conductivity measurements were obtained by utilizing complex impedance plots to determine bulk resistivity.

Fabrication of Membrane Electrode Assemblies

Membrane electrode assemblies (MEAs) were prepared by heat-pressing the polymer electrolyte membrane sample, in its hydrated state, with catalyzed teflon-impregnated porous carbon electrodes to form a single component. The assemblies tested in direct methanol fuel cells had electrode areas of 6.45 $cm^2$ (1"×1") and 25 $cm^2$ (2"×2"). The preparation of catalyst electrodes is achieved by preparing a paste of electrocatalyst, Nafion H (5% by weight solution dispersed in lower alcohols) and an aqueous solution of fluorinated polyethylene (PTFE). This paste was either applied to PTFE-treated porous carbon paper or directly deposited on the membrane surface.

Evaluation of the Performance of PSSA-PVDF Membranes in Direct Methanol Fuel Cells The direct electrochemical oxidation of methanol and trimethoxymethane was investigated in liquid-feed fuel/oxygen cells which contained MEAs with PSSA-PVDF membranes as the solid polymer electrolyte. In this design, an aqueous solution of the organic fuel was fed to the anode compartment which contained about 4 mg cm$^{-2}$ of Pt/Ru (1:1) electrocatalyst, and oxygen was supplied to the cathode which contained about 4 mg cm$^{-2}$ of Pt electrocatalyst. The cell was operated at temperatures ranging from 20 to 90° C. and was heated at the cell block and the anodic fuel reservoir which was equipped with a condenser to prevent evaporation but allow removal of carbon dioxide from the system. The organic fuel was typically prepared as a 1 M solution and circulated at flow rates of 1 L/minute or higher. The cathode compartment was pressurized with 20–30 psi oxygen and regulated with a valve located in the cathode exit stream. Oxygen flow rates ranged from 3 L/minute to less than 0.01 L/minute, and were measured in the inlet stream. The cells were operated at current densities in the range of 1–400 mA/cm.

Measurement of Crossover Rates in Direct Methanol Fuel Cells

The methanol crossover rates present in operating fuel cells was measured by analyzing the carbon dioxide content of the cathode exit stream. This was accomplished by utilizing an on-line analyzer (Horiba Company) which measured the carbon dioxide volume present in the cathode exit stream passing through an infra-red detector. Prior to each measurement, the instrument was calibrated with gases of known carbon dioxide content.

The behavior and characteristics of PSSA-PVDF polymer electrolyte membranes as well as results obtained from their use in fuel cells are described in the following section.

Results

1. Methanol Crossover Rates with PSSA-PVDF Membranes

Figure 3:
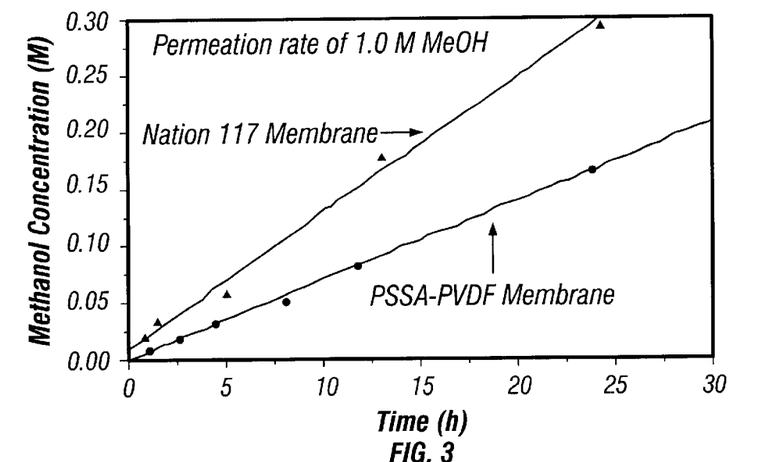
FIG. 3 is a graphical comparison of the permeation rates of a 1 M methanol solution across PSSA-PVDF and Nafion 117 membranes.

To serve as a preliminary screening method, methanol permeability was measured for a number of samples by using the apparatus shown in FIG. 2 and described in Example 1. As illustrated in FIG. 3, the amount of methanol which permeated across the PSSA-PVDF membrane was about half the amount observed with the use of a Nagion 117 membrane. This behavior of lower methanol crossover rates with PSSA-PVDF membranes was observed at all the indicated temperatures of investigation.

2. Conductivity of Electrolyte Membranes

Figure 4:
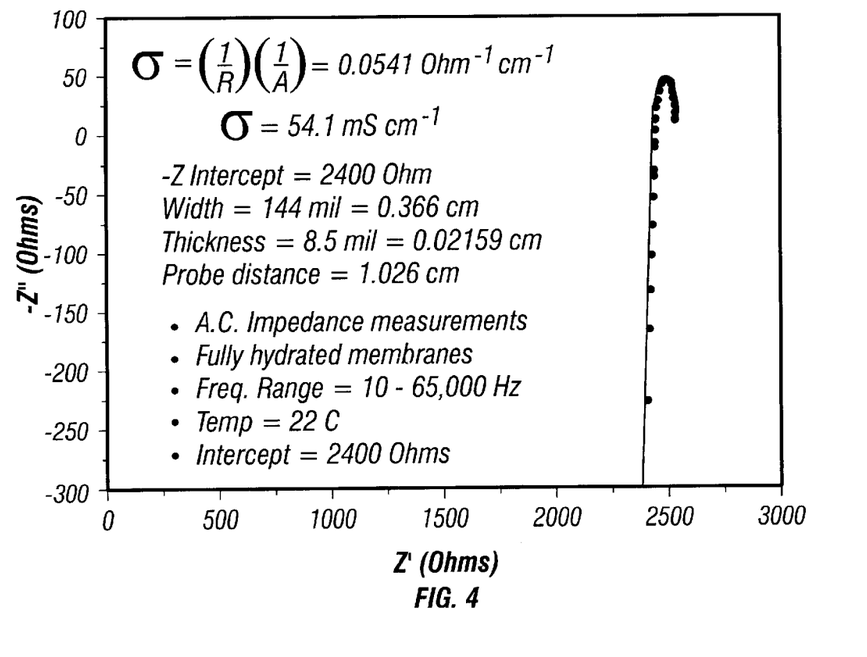
FIG. 4 is a graph representing conductivity measurement for a PSSA-PVDF membrane using a four-probe apparatus and a.c. complex impedance technique.

The conductivity for PSSA-PVDF membranes was obtained from complex impedance plots for the determination of bulk resistivity. The complex impedance for a representative sample is shown in FIG. 4, which corresponds to a conductivity value of 54 mS/cm. The conductivity of a Nagion 117 membrane sample was measured under identical conditions and was determined to be about 76 mS/cm, which correlates well with published values. Fontanella et al., *Solid State Ionics*, 1993, 66, 1. It is, therefore, evident that the conductivity of a PSSA-PVDF membrane is of the same order of magnitude as that of a Nagion 117 membrane.

3. Performance of PSSA-PVDF Membranes in Direct Methanol Fuel Cells

Figure 5:
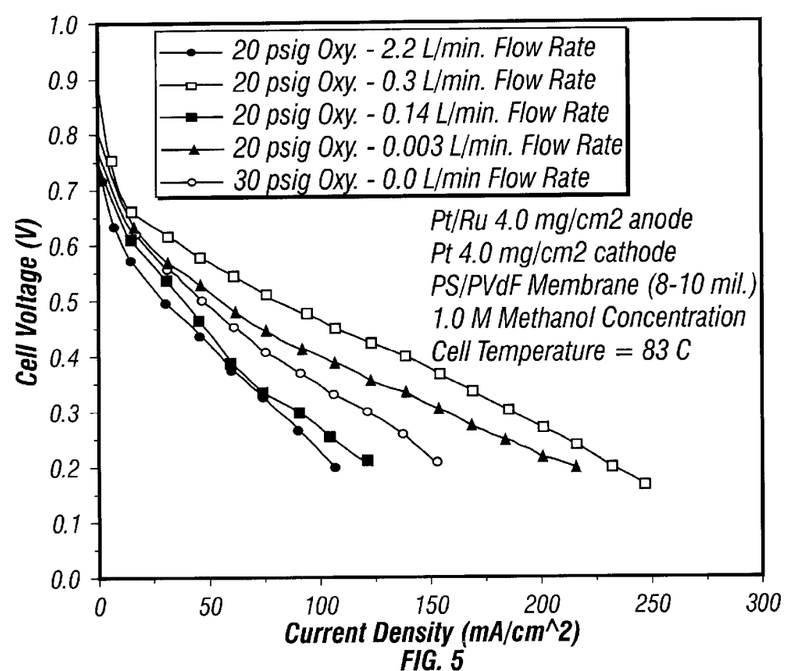
FIG. 5 is a graph illustrating the performance of a PSSA-PVDF membrane in a direct methanol fuel cell with a 1 M methanol solution at 83° C.

A PSSA-PVDF membrane was fabricated into a one inch by one inch size membrane electrode assembly (MEA) (electrode area=6.45 cm$^2$) by the method described in Example 3. The anode had about 4 mg/cm$^2$ of Pt/Ru electrocatalyst and the cathode had about 4 mg.cm$^2$ of fuel grade Pt (Alfa-Aesar Company), both supported on teflonized carbon paper. The MEA was tested in a direct methanol fuel cell and was observed to deliver high voltages at relatively high current densities, as illustrated in FIG. 5. The best performance was observed under conditions of high oxygen pressure and low flow rate. Observed performance of the MEA improved dramatically upon a decrease in oxygen flow rate to the cathode. This behavior is due to an increase in the resistivity of the fuel cell, probably due to a drying out effect of the membrane. Increased resistance of the membrane upon operation with higher flow rates is due to the dependence of conductivity on the hydration level of the membrane. This dehydration phenomenon observed at higher flow rates may be alleviated by humidification of the oxygen stream or possibly by introduction of hydrophilic components (polymer coating or by modification of existing membrane surface). Alternatively, one can also modify electrode structure composition.

Figure 6:
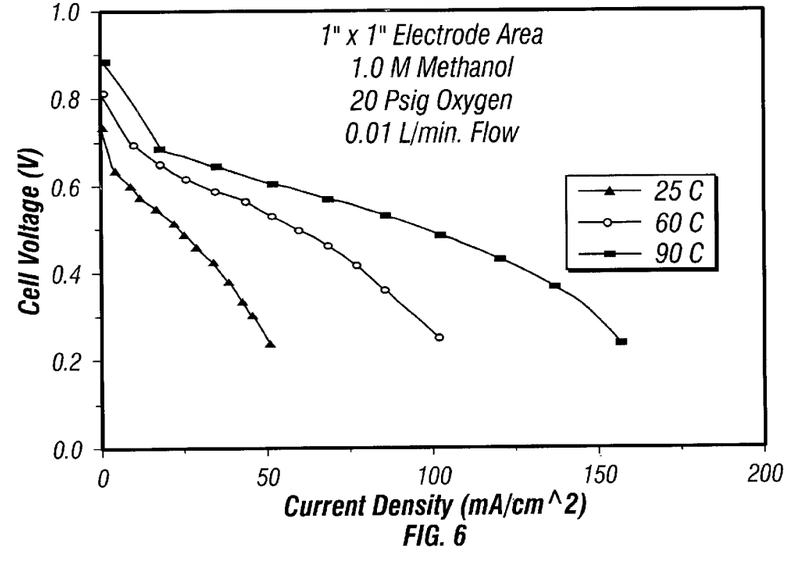
FIG. 6 is a graph illustrating the effect of temperature on the performance of a one inch by one inch membrane electrode assembly containing a PSSA-PVDF membrane in a direct methanol fuel cell.
Figure 7:
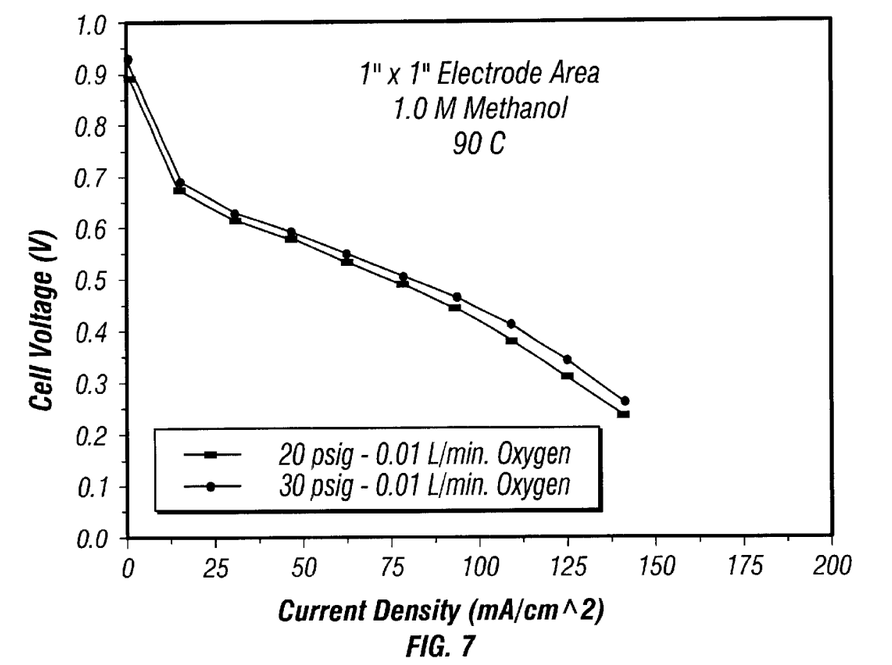
FIG. 7 is a graph illustrating the effect of pressure on the performance of a one inch by one inch membrane electrode assembly containing a PSSA-PVDF membrane in a direct methanol fuel cell.

Performance achieved with the PSSA-PVDF membrane was verified by fabricating another one inch by one inch electrode area MEA which was tested in a direct methanol fuel cell. The effect of temperature and pressure on the performance of the fuel cell is shown in FIGS. 6 and 7, respectively. Performance is enhanced by operating the cell at higher temperatures, and to a lesser extent, at higher pressures.

Figure 8:
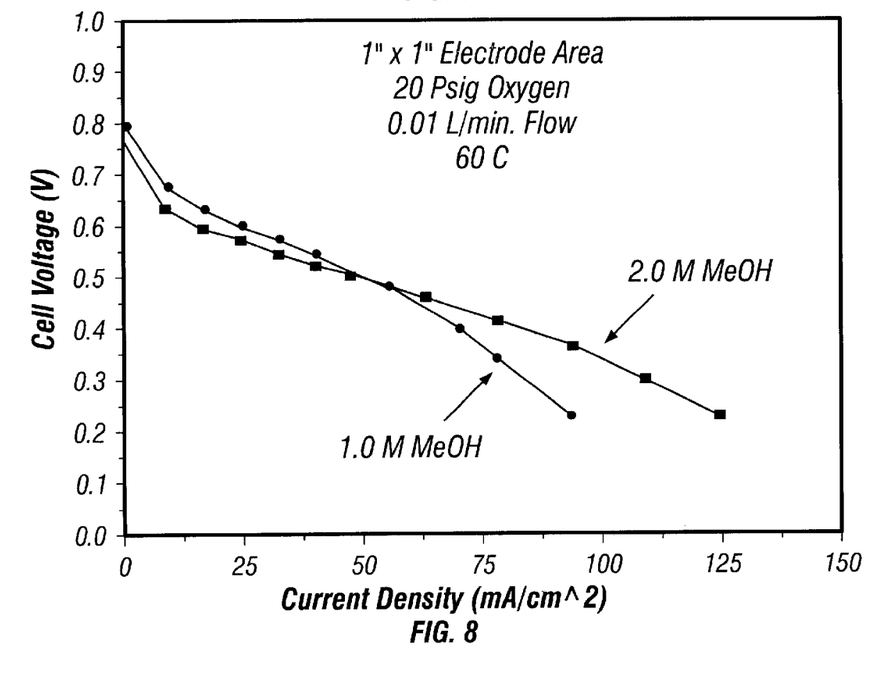
FIG. 8 is a graph illustrating the effect of methanol concentration on the performance of a one inch by one inch membrane electrode assembly containing a PSSA-PVDF membrane in a direct methanol fuel cell.

The effect of methanol concentration on the performance of PSSA-PVDF membranes in direct methanol fuel cells was also investigated and the results are illustrated in FIG. 8. It is evident that improved performance may be realized at higher current densities when greater methanol concentration is used. The inferiority of a 2 M methanol solution at lower current densities may be ascribed to increased methanol crossover rates compared to those observed with a 1 M methanol solution.

Figure 9:
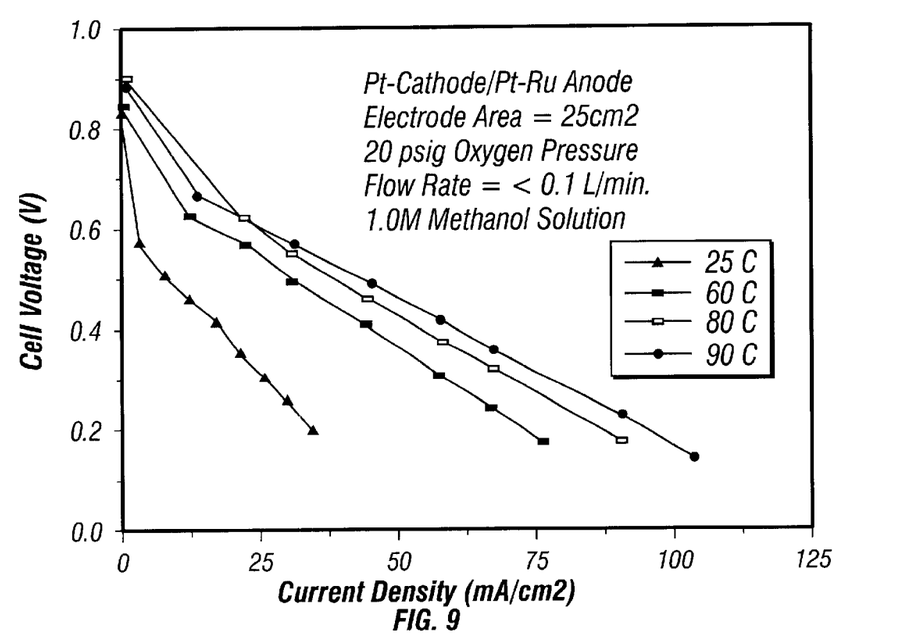
FIG. 9 is a graph illustrating the effect of temperature on the performance of a two inch by two inch membrane electrode assembly containing a PSSA-PVDF membrane in a direct methanol fuel cell.

PSSA-PVDF membranes were fabricated into larger membrane electrode assemblies and tested in two inch by two inch direct methanol fuel cells (electrode area=25 cm$^2$). The electrocatalytic mixture was deposited onto teflonized carbon electrodes, which were then heat-pressed with the membrane. The performance of this MEA as a function of temperature is shown in FIG. 9. The electrical performance of a two inch by two inch MEA in a fuel cell was inferior to that of a smaller size MEA. The decrease in performance upon increasing electrode size is probably due to poor interfacial contact between the membrane and the electrocatalytic layer.

Figure 10:
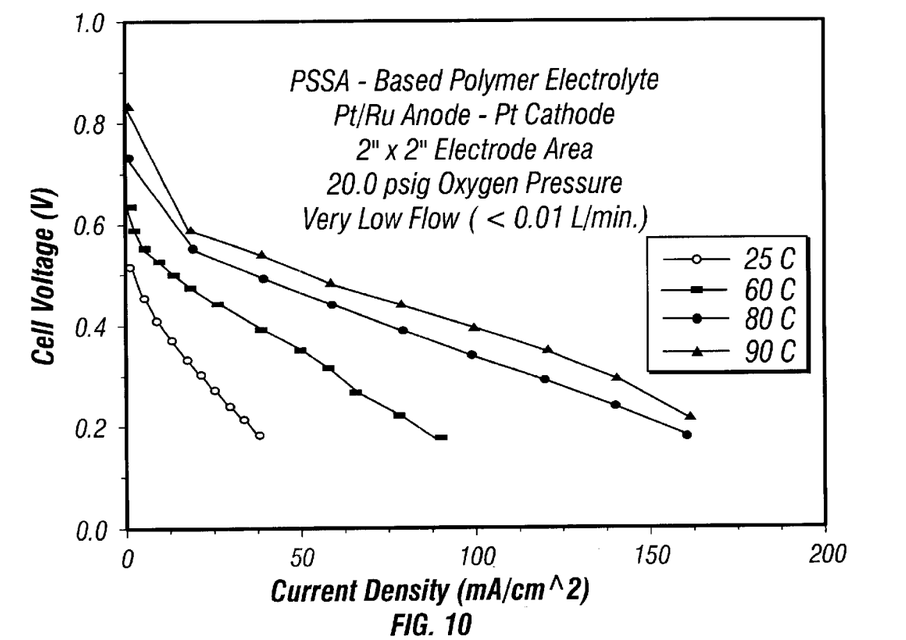
FIG. 10 is a graph illustrating the effect of temperature on the performance of a two inch by two inch membrane electrode assembly containing a PSSA-PVDF membrane in a direct methanol fuel cell wherein the electrocatalytic mixture was directly applied to the membrane.

FIG. 10 illustrates the performance of a two inch by two inch membrane electrode assembly containing a PSSA-PVDF membrane in a direct methanol fuel cell wherein the electrocatalytic mixture was directly applied to the membrane. As observed in FIG. 10, the electrical performance of two inch by two inch MEAs fabricated with PSSA-PVDF membranes improved if the electrocatalytic mixture was directly applied to the membrane instead of being deposited onto carbon paper. The increased electrical performance of the MEA is ascribed to improved contact between the electrocatalytic layer and the polymer electrolyte membrane, thus enabling better catalyst utilization and higher reaction rates.

4. Crossover Rates in Direct Methanol Fuel Cells

Figure 11:
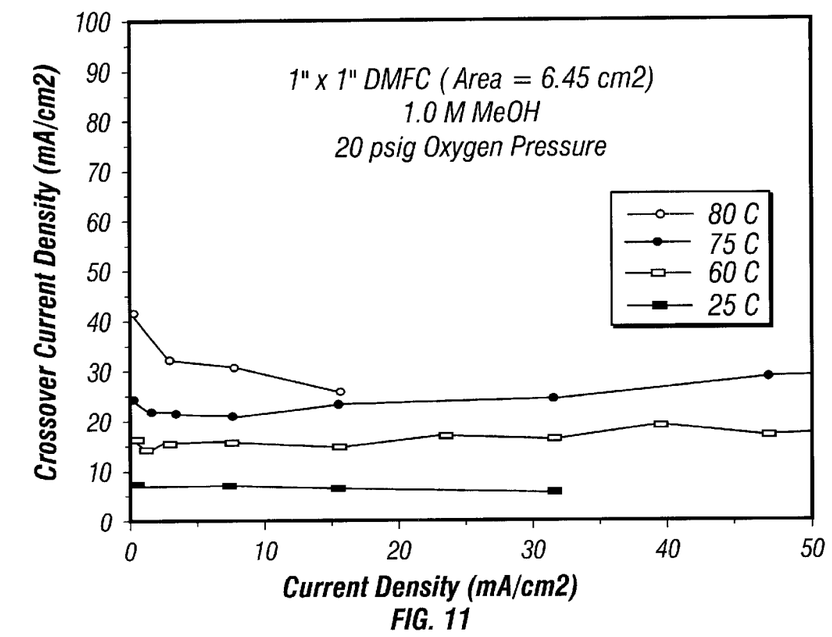
FIG. 11 is a graph illustrating the effect of temperature on methanol crossover rates, expressed as crossover current densities, for a one inch by one inch membrane electrode assembly containing a PSSA-PVDF membrane in a direct methanol fuel cell.

Methanol crossover rates observed with MEAs fabricated with PSSA-PVDF membranes are significantly lower than methanol crossover rates observed with analogous Nafion systems. In order to measure methanol crossover rates, the carbon dioxide content of the cathode exit stream was analyzed in operating methanol fuel cells in which PSSA-PVDF membranes were used as the polymer electrolyte. FIG. 11 illustrates methanol crossover rates, expressed as crossover current densities, at different temperatures for a one inch by one inch MEA. It is observed that methanol crossover rates increase in the fuel cell as a function of temperature. However, these values are substantially lower than the typical values observed when Nagion 117 membranes are used in direct methanol fuel cells. Methanol crossover rates in PSSA-PVDF-containing direct methanol fuel cells is about 85% lower than that observed in direct methanol fuel cells containing Nagion 117 membranes. It is noteworthy that methanol crossover characteristics, expressed as crossover current densities, do not change substantially as a function of current density, which is a general characteristic of low methanol permeability membranes. Dependance of methanol crossover on current density is, in fact, observed with systems that employ Nafion as the electrolyte.

Figure 12:
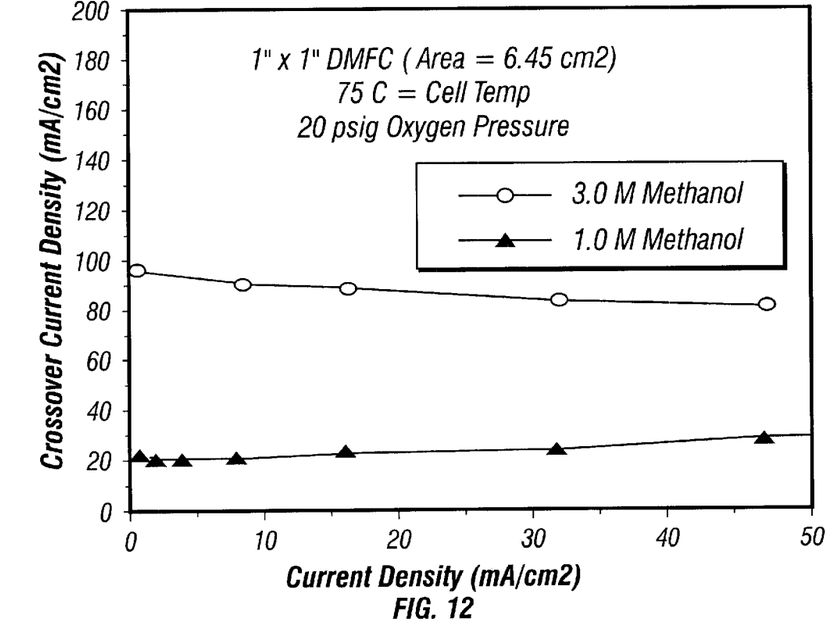
FIG. 12 is a graph illustrating the effect of methanol concentration on methanol crossover rates, expressed as crossover current densities, for a one inch by one inch membrane electrode assembly containing a PSSA-PVDF membrane in a direct methanol fuel cell.

Methanol crossover rates were also measured for 3 M methanol solutions in operating fuel cells and compared to methanol crossover rates measured for 1 M methanol solutions. As illustrated in FIG. 12, the methanol crossover rate was about three times higher for the 3 M methanol solution than for the 1 M methanol solution.

Figure 13:
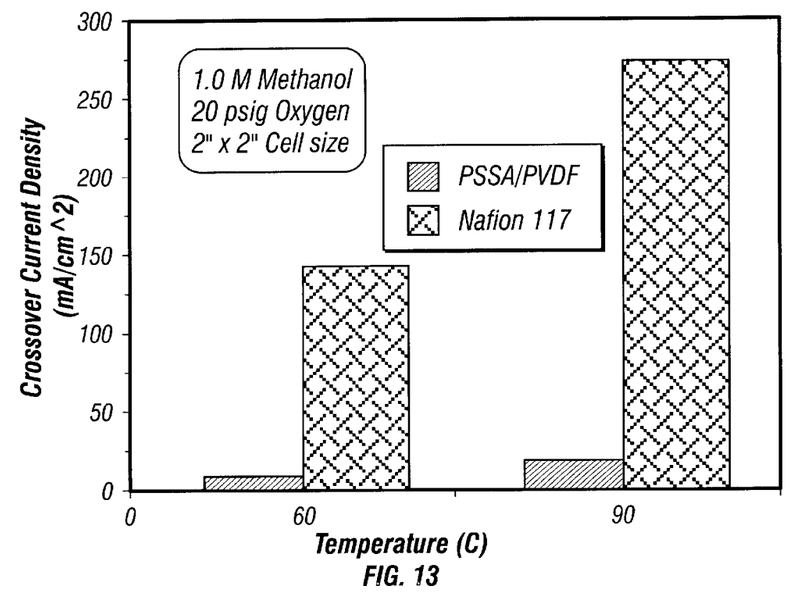
FIG. 13 is a bar graph comparing the methanol crossover rates for PSSA-PVDF and Nagion 117 membranes, at 60° C. and 90° C., in direct methanol fuel cells.

A comparison of the methanol crossover current densities for systems using PSSA-PVDF and Nagion 117 membranes is illustrated in FIG. 13. As is evident, the methanol crossover rate for a PSSA-PVDF-containing direct methanol fuel cell is significantly lower than the methanol crossover rate for a Nagion 117-containing direct methanol fuel cell at 60° C. as well as a higher temperature of 90° C.

5. Resistivity of Polymer Electrolyte Membranes in Direct Methanol Fuel Cells

Figure 14:
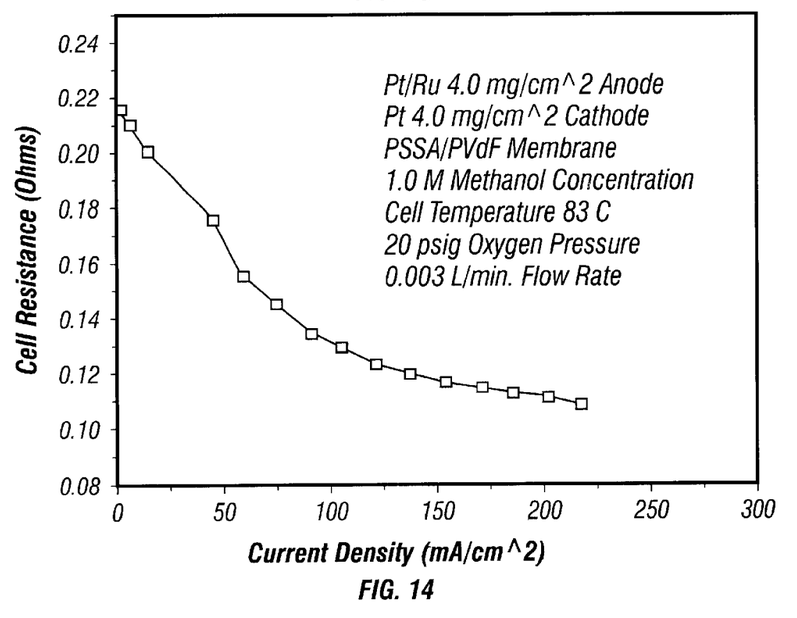
FIG. 14 is a graph illustrating the effect of current density on the cell resistance of a one inch by one inch membrane electrode assembly containing a PSSA-PVDF membrane in a direct methanol fuel cell.

Cell resistance of a one inch by one inch membrane electrode assembly containing a PSSA-PVDF membrane in a direct methanol fuel cell was measured as a function of current density. The fuel cell was operated at 83° C. using a 1 M methanol solution and 20 psi of oxygen pressure. FIG. 14 shows that when a PSSA-PVDF membrane is used as the electrolyte, cell resistance of the fuel cell decreased as a function of current density. This type of behavior is thought to be dependant on the hydration level of the PSSA-PVDF membrane, which increases as a function of current density due to the presence of electroosmotic drag.

6. Fuel and Fuel Cell Efficiency

Figure 15:
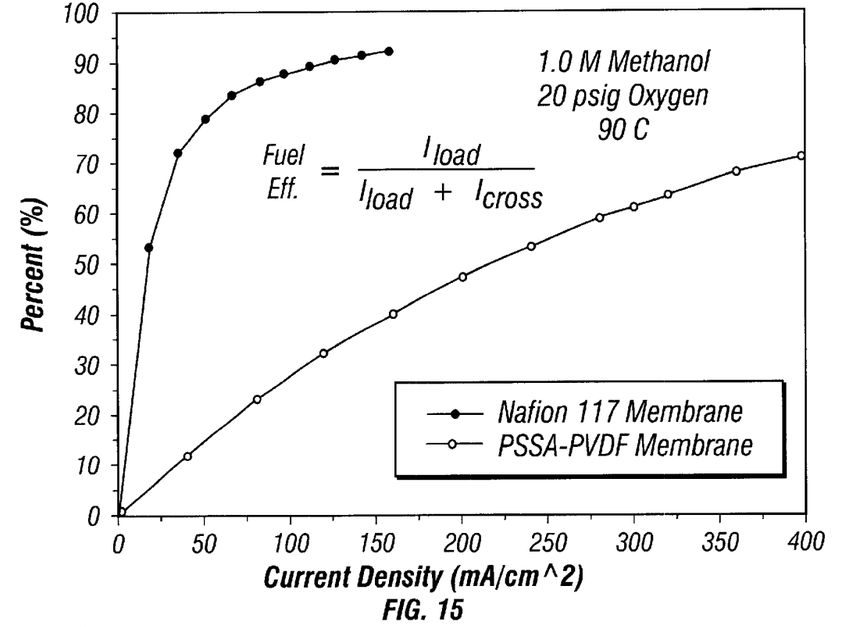
FIG. 15 is a graph comparing the fuel efficiency (expressed as a percentage) of direct methanol fuel cells containing PSSA-PVDF and Nagion 117 membranes.

An important feature of PSSA-PVDF membranes in direct methanol fuel cell applications is the high fuel efficiencies that are attainable when compared to Nafion-based membranes. This is primarily due to the low methanol crossover characteristics of the PSSA-PVDF membrane, which translates into improved fuel utilization. A comparison of the fuel efficiencies of fuel cells operating with PSSA-PVDF membranes and Nagion 117 membranes is illustrated in FIG. 15. It is evident that a fuel cell using a PSSA-PVDF membrane has a much higher efficiency at all current densities, having fuel efficiency of about 90% at 100 mA/cm$^2$, whereas a fuel cell having a Nagion 117 membrane yields under 30% at the same current density. Thus, it is apparent that the application of PSSA-PVDF membranes is extremely promising for direct methanol fuel cells and represents a major improvement over Nafion 117 membranes which display adequate fuel efficiencies only at very high current densities.

Figure 16:
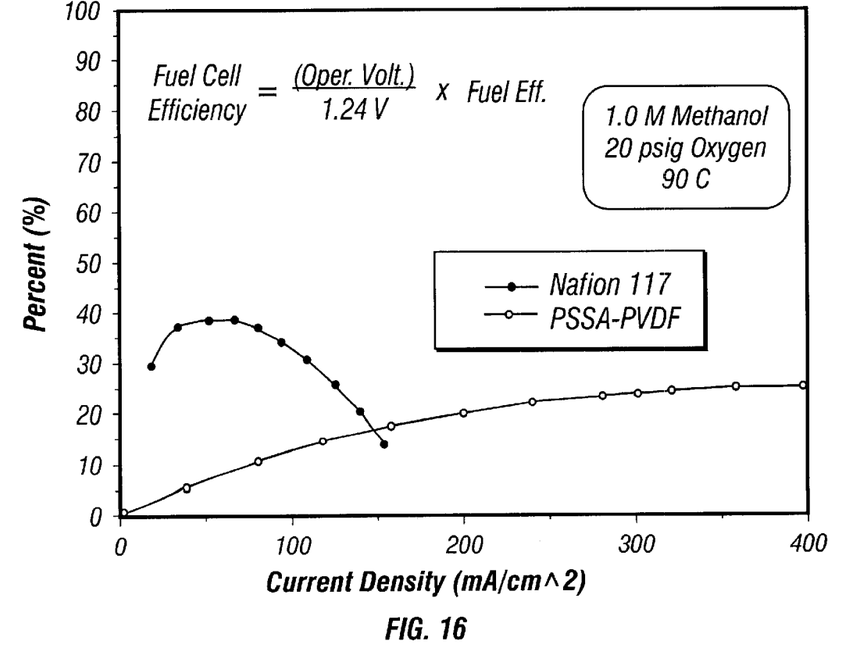
FIG. 16 is a graph comparing the fuel cell efficiency (expressed as a percentage) of direct methanol fuel cells containing PSSA-PVDF and Nagion 117 membranes.

The fuel cell efficiencies of direct methanol fuel cells operating with PSSA-PVDF and Nagion 117 membranes have also been determined and is illustrated in FIG. 16. Fuel cell efficiencies of about 40% were obtained with a fuel cell using a PSSA-PVDF membrane as the electrolyte at low current densities, which is a 3–4-fold improvement in fuel cell efficiency over a Nagion 117-based system at analogous current densities. Thus, it is clearly evident that systems employing PSSA-PVDF membranes are superior for direct methanol fuel cell applications, particularly at low current densities where Nafion-based systems display poor efficiencies.

It is envisioned that fuel and fuel cell efficiency may be further improved by optimizing techniques for the fabrication of polymer electrolyte membranes. Thinner, more uniform membranes may be fabricated by using commercially available PVDF (Kynar) sheets of varied thickness and porosity to serve as the inert matrix host polymer. Other matrix polymers can be assessed for their use in polymer electrolyte membranes such as poly(fluoroethylene-co-hexafluoropropylene) (FEP). FEP (DuPont Chemical Company) is commercially available (10×10 cm sheets) as thin films ranging in thickness from 50 mm to 125 mm. FEP is similar to PVDF but, being fully fluorinated, may possess additional desirable properties compared to PVDF. Perfluorinated polymers may also be used in the fabrication process.

Also, radiation-grafted membranes of low thickness (100 mm) and low ionic resistivity (<10 Ohm.cm) are available commercially (Pall RAI, Inc.). It may be desirable to determine the suitability of such radiation-grafted membranes for application in direct methanol fuel cells.

An important aspect of a polymer electrolyte membrane in a membrane electrode assembly is the nature of the interface between the electrocatalyst on the electrodes and the membrane. The degree of interpenetration between the two solid phases is small, resulting in poor catalyst utilization and the need for high electrocatalyst loading. Fabrication methods for improving the interfacial contact in a membrane electrode assembly are also desired. One such method involves casting a mixture of polymer and solvent into a heated Teflon-bonded electrode or a dry Teflon-electrocatalyst mixture. Further, the electrocatalyst may be directly deposited (precipitation, painting, spraying, etc.) on the membrane surface. Furthermore, grid-type backings may be employed, or the polymer electrolyte membrane may be swollen before subjecting it to the hot pressing step or prior to deposition of the catalyst involved in the fabrication process described in Example 1.

CONCLUSION

Fuel cells of the present invention comprise polymer electrolyte membranes composed of polystyrene sulfonic acid (PSSA) and poly(vinylidene fluoride) (PVDF). Dramatically lower methanol crossover rates (up to 95% reduction) were demonstrated with the fuel cells of the present invention than those displayed by fuel cells having Nafion-based membranes such as membranes made of Nagion 117. Also, application of PSSA-PVDF membranes in direct methanol fuel cells has been demonstrated in one inch by one inch and two inch by two inch fuel cells and was shown to sustain relatively high current densities. Operation of fuel cells bearing PSSA-PVDF membranes capable of sustained high current oxidation while maintaining low methanol crossover rates translates into fuel cell systems that exhibit improved fuel and fuel cell efficiencies.

Example 2

For the second example, a different precursor is used. Any inert polymer that has the ability to impregnate with ionomer or ionomeric precursor can be used, including:

| | |
|---|---|
| Polytetrafluorethylene - N-vinylpyrrolidone | (PTFE-PVP) |
| Polytetrafluorethylene | (PTFE) |
| Polyvinyl alcohol - polyacrylonitrile | (PVA-PAN) |
| Polyvinyl chloride | (PVC) |
| Polyvinyl alcohol | (PVA) |
| Polyacrylamide | (PAAM) |

| | |
|---|---|
| Polyethylene oxide | (PEO) |
| Polypropylene | (PP) |
| Polyethylene | (PE) |
| Polysulfone | (PS) |
| Sulfonated polysulfone | |
| Polyethersulfone | (PES) |
| Polyetherimide | (PEI) |
| Polymethylsulfoxide | |
| Polyacrylonitrile | |
| Glass membrane composites (hollow fibers) | |
| Ceramic matrix host composites | |
| Zeolite matrix hosts | |

These materials can be used as the inert polymer matrices, instead of PVDF, into which the PS/DVB mixtures are impregnated to produce interpenetrating polymer networks. Or, alternatively these materials can be blended with PVDF to produce composite inert host matrices and then subsequently impregnated with PS/PVDF.

At present, these other polymers are less preferred. The rest of the operations are the same as the steps discussed above in the first example.

However, the degree of porosity of the material will effect the amount of weight gain, and hence may effect the repetition steps described above.

Example 3

The third example modifies any of the above two examples by using a modification of the ionomer.

Although only a few embodiments have been described in detail above, those having ordinary skill in the art will certainly understand that many modifications are possible in the preferred embodiment without departing from the teachings thereof. For example:

Cross-Linking Agents

DVB may also be substituted with other cross-linking agents which have longer tethers, thus altering properties of polymer. The polymerization may be initiated by a number of different methods, which include the use of: azobis (isobutyronitrile) (AIBN), peroxides (i.e., benzoyl peroxide, diacetyl peroxide, and di-t-butyl peroxide), hydroperoxides (i.e., cumyl hydroperoxide), photoinitiators (i.e., disulfides, benzoin, and benzil), as well as by thermal cross-linking methods (i.e., using hot press).

Alternative Membrane Fabrication Techniques

Membranes can be prepared by the copolymerization of the propyl ester of p-styrenesulfonic acid with styrene and divinylbenzene and subsequent hydrolysis of the polymer to produce polystyrenesulfonic acid (PSSA). This method enables the preparation of membranes of various capacities with sulfonate groups distributed uniformly throughout the bulk of the membrane. It should be possible to modify this technique such that the polymerization and formation of polystyrenesulfonic acid are performed within a matrix host, such as PVDF, to produce interpenetrating polymer network membranes.

Use of Fluorinated Sulfactants with Fluorinated Polymer Matrix

Matrix polymers, including polyhalogenated ethylene polymers (such as polytetrafluoro-ethylene or polytrifluoromonochloroethylene), can be sufficiently wetted with highly fluorinated aliphatic surfactants. The use of surfactants, 0.001% to 1.0% addition to electrolyte, resulted in substantial electrolyte retention (up to 300% more retential) by the PTFE structure. The best surfactants identified were: the ammonium, potassium, or sodium salt of a-completely fluorinated aliphatic monocarboxylic acids (such as caprylic acid, caproic acid, octanoic acid, nonoic acid, decanoic acid, lauric acid, myristic acid, tridecanoic acid and perfluoroalkyl sulfonates (such as ammonium perfluorononyl sulfonate. Surfactants can be utilized in current MEA technology for direct methanol fuel cells which employ PSSA-PVDF membranes, or other similar membranes which include polyhagenated ethylene polymers. The use of these types of surfactants in the electrocatalytic layer may be used to enable better wetting of the PVDF structure which should enable better interpenetration of the ionomer containing electrocatalytic layer into the membrane. Thus, this method should lead to MEAs with improved electrode/membrane bonding characteristics and better interfacial contact due to the fact that the ionomeric material can more effectively interpenetrate the membrane structure.

Applying Catalytically Active Metals to Ion Exchange Membranes

Catalytically active metals for use as electrode onto a base can be deposited and subsequently transferred to an ion-exchange membrane. The active material can be deposited onto a conducting base that can be a single plate or a moving drum or strip. The deposit is washed and dried while in contact with the base and then transferred using heat and pressure directly to an ion-exchange membrane. The conducting base can be stainless steel or Monel or Nichrome, tantalum, or other conductive metal resistant to corrosion.

The sulfonated styrene polymer can also be swelled.

The application of the electrolytic coating to the membrane can be accomplished by the application of heat and/or pressure and by the use of adhesive materials or solvents to the membrane polymer. A swelling solvent or a plasticizer can be utilized for the ion-exchange membrane. Sulfonated styrene polymers can be swelled with by incorporation of alcohols, ketones, amines, dimethylformamide, dimethylacetamide, and dimethylsulfide.

The material can be transferred to the membrane. This transfer of material to the membrane should be at a temperature high enough to soften the polymer. Best transfer occurs at the higher end of the temperature range (i.e., 200–250° F.) for a copolymer of trifluorochloroethylene and vinylidene fluoride. An applied pressure of 2,000 psi is preferable. The pressure must be sufficient to enable penetration of the catalytically active material at least 100–1000 Å into the membrane structure.

All such modifications are intended to be encompassed within the following claims.

Alternative Methods

1. Altering the melt flow characteristics of the polymer membrane by exchange of existing cation ($H^+$) with other ions ($NR_4^+$, $Na^+$, $K^+$, $Cs^+$, $Zn^{2+}$, $Ca^{2+}$, etc.) . This cation exchange can also be performed on the ionomer material contained in the electrocatalytic layer. Alternatively, one can use the sulfonyl fluoride form of the ionomer and subsequently hydrolyze to the protonic form (—$SO_3H$) after MEA fabrication.

2. Surface Modification Techniques.

Dip coating technique sulfonation of surfaces incorporation Nafion layer on surface composite Nafion/PSSA/PVDF membranes Physical scoring of membrane surface

What is claimed is:

1. A fuel cell element which is intended for use in an electrochemical reaction in a fuel cell comprising a polymer electrolyte membrane said membrane being in the form of an interpenetrating network composed of polystyrene sulfonic acid crosslinked within a poly(vinylidene fluoride) matrix, prepared by impregnating a poly(vinylidene fluoride) matrix with styrene monomer and a crosslinking monomer, copolymerizing the styrene monomer and the crosslinking monomer within the poly(vinylidene fluoride) matrix to form a first membrane in the form of an interpenetrating network comprising a crosslinked polystyrene polymer within the poly(vinylidene fluoride) matrix, and sulfonating the first membrane to form a final membrane in the form of an interpenetrating network comprising crosslinked sulfonated polystyrene polymer within the poly(vinylidene fluoride) matrix.

2. The fuel cell element of claim 1 wherein said fuel cell is a liquid-feed fuel cell.

3. The fuel cell element of claim 2 wherein said fuel cell is a direct methanol fuel cell.

4. A methanol fuel cell comprising:

an anode;

a cathode;

a proton-conducting electrolyte, said electrolyte being a polymer electrolyte membrane in the form of an interpenetrating network composed of polystyrene sulfonic acid crosslinked within a poly(vinylidene fluoride) matrix prepared by impregnating a poly(vinylidene fluoride) matrix with styrene monomer and a crosslinking monomer, copolymerizing the styrene monomer and the crosslinking monomer within the poly(vinylidene fluoride) matrix to form a first membrane in the form of an interpenetrating network comprising a crosslinked polystyrene polymer within the poly(vinylidene fluoride) matrix, and sulfonating the first membrane to form a final membrane in the form of an interpenetrating network comprising crosslinked sulfonated polystyrene polymer within the poly(vinylidene fluoride) matrix; and a pump element, moving said methanol to contact with said anode.

5. The fuel cell of claim 4 wherein said organic fuel is methanol.

6. The fuel cell of claim 5 which is a direct methanol fuel cell.

7. A method of decreasing methanol crossover rate in a methanol-based fuel cell comprising obtaining a polymer matrix, impregnating said polymer matrix with a mixture comprising styrene and a crosslinking agent, polymerizing said styrene and said crosslinking agent within said polymer matrix to form a membrane in the form of an interpenetrating network comprising a crosslinked polystyrene polymer within said polymer matrix, sulfonating said membrane to form a final membrane in the form of an interpenetrating network comprising crosslinked sulfonated polystyrene polymer within said polymer matrix, and using said final membrane in an electrochemical reaction in said fuel cell.

8. The method of claim 7 wherein said organic fuel is methanol.

9. The method of claim 7 wherein said fuel cell is a direct methanol fuel cell.

10. A method of enhancing efficiency of a fuel cell by using a fuel cell element in an electrochemical reaction in said fuel cell comprising forming a polymer electrolyte membrane by impregnating a poly(vinylidene fluoride) matrix with styrene monomer and a crosslinking monomer, copolymerizing the styrene monomer and the crosslinking monomer within the poly(vinylidene fluoride) matrix to form a first membrane in the form of an interpenetrating network comprising a crosslinked polystyrene polymer within the poly(vinylidene fluoride) matrix, and sulfonating the first membrane to form a final membrane in the form of an interpenetrating network comprising crosslinked sulfonated polystyrene polymer within the poly(vinylidene fluoride) matrix, and using said membrane to decrease a permeation of organic fuel which is present in said fuel cell.

11. The method of claim 10 wherein said organic fuel is methanol.

12. The method of claim 10 wherein said fuel cell is a direct methanol fuel cell.

13. A method according to claim 7 wherein said polymer matrix comprises polyvinylidene fluoride.

14. A method according to claim 7 wherein said crosslinking agent comprises divinylbenzene.

* * * * *

UNITED STATES PATENT AND TRADEMARK OFFICE
CERTIFICATE OF CORRECTION

PATENT NO. : 6,444,343 B1
DATED : September 3, 2002
INVENTOR(S) : G.K. Surya Prakash et al.

It is certified that error appears in the above-identified patent and that said Letters Patent is hereby corrected as shown below:

Column 1,
Line 6, before FIELD OF THE INVENTION, please insert -- STATEMENT OF FEDERALLY-SPONSORED RESEARCH
    The invention described herein was made in the performance of work under a NASA 7-1407 contract, and is subject to the provisions of Public Law 96-517 (U.S.C. 202) in which the contractor has elected to retain title. --

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,444,343 B1
DATED : September 3, 2002
INVENTOR(S) : G.K. Surya Prakash et al.

It is certified that error appears in the above-identified patent and that said Letters Patent is hereby corrected as shown below:

<u>Title page,</u>
Item [73], Assignee, please insert -- and California Institute of Technology, Pasadena, CA (US) --.

Signed and Sealed this

Seventeenth Day of June, 2003

JAMES E. ROGAN
*Director of the United States Patent and Trademark Office*